Aug. 9, 1932.  J. MILLER  1,871,072

VALVE

Filed Dec. 11, 1931

WITNESSES
A. B. Wallace.
F. B. Flick

INVENTOR
John Miller
by Brown & Critchlow
his attorneys.

Patented Aug. 9, 1932

1,871,072

UNITED STATES PATENT OFFICE

JOHN MILLER, OF CRAFTON, PITTSBURGH, PENNSYLVANIA

VALVE

Application filed December 11, 1931. Serial No. 580,247.

This invention relates to valves, and particularly to non-leaking valve stem constructions.

An object of the invention is to provide valves provided with stems which are positively sealed against leakage, both in the open and closed positions, in which pressure of fluid acting upon the stem assists in sealing it against leakage, packing glands and the need for frequently repeated packing are eliminated, and frictional engagement and wear between the stationary and rotating parts of the stem are reduced to a minimum.

A special object of the invention is to provide valves of the type referred to with replaceable valve seats and with valve heads which cooperate to minimize wear and to insure perfect and positive closing of the valve.

Figure 1:
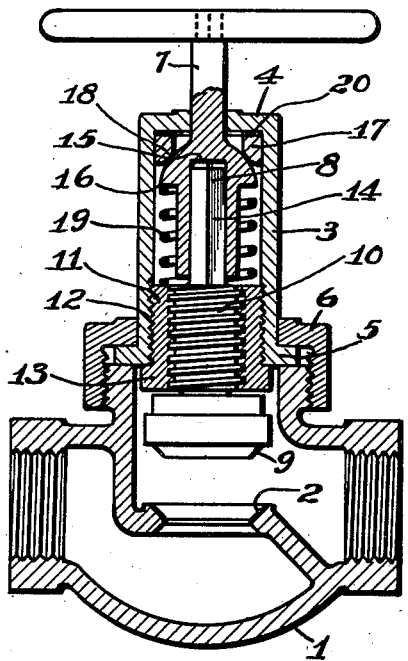
Figure 2:
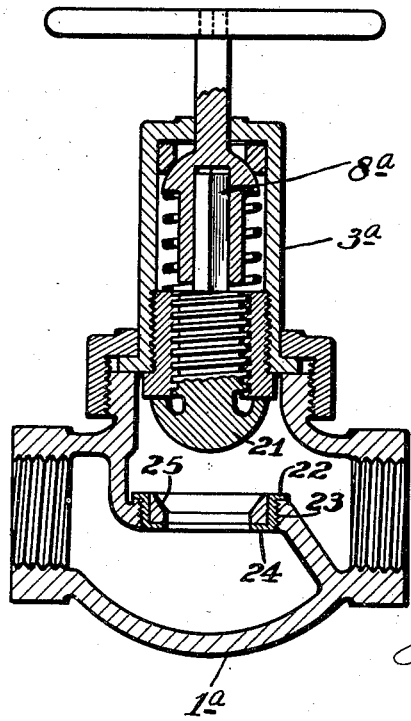

The invention may be described in connection with the accompanying drawing, in which Fig. 1 is a vertical sectional view showing one embodiment of the invention; and Fig. 2 is a fragmentary view similar to Fig. 1 showing a modified embodiment.

In accordance with the invention leak-tight valve stems are provided by the use of a valve stem comprising upper and lower stem members extended through and slidably connected within an enclosing cap which is rigidly connected to the valve body opposite its valve seat. The lower member carries a valve disc, or head, and it is actuated in and guided by screw threads in a manner similar to that of stems of conventional construction. The upper member is provided within the cap with a spherically surfaced sealing flange which cooperates with a hard substantially unyielding gasket ring to seal the stem. A spring impels the flange positively into continuous sealing engagement, and this action is augmented by internal fluid pressure acting on the flange, as by leakage of fluid into the cap from within the valve.

The invention may be understood further by reference to Fig. 1 of the accompanying drawing. The embodiment there shown comprises a conventional valve body 1 provided with an ordinary valve seat 2. Mounted opposite seat 2 is a tubular cap member 3 having at its upper end a shoulder 4 projecting inwardly over the top, and having at its lower end an outwardly projecting flange 5 engaged by a retaining nut 6 connected to the valve body to hold the cap rigidly in place. The stem comprises upper and lower members 7 and 8, respectively, extending through the cap.

The lower member carries at its lower end a swiveled valve disc, or head, 9 adapted to cooperate with seat 2 to close the valve. Above head 9 is a shank portion provided with screw threads 10 which move in similar threads formed in a sleeve 11 held in fixed position in the lower end of cap 3. The sleeve may be associated with cap 3 in any suitable manner, as by means of internal threads 12 screwed into threads formed internally of the cap at its lower end, and a flange 13 which seats against the lower end of the cap limits the upward movement of the sleeve to a fixed position. The screw threaded portion of shank 10 terminates at its upper end in a portion 14 of non-circular, for example square, cross section.

Upper stem member 7 projects upwardly through the cap through shoulder 4. Its lower end is provided with a bore 15 in which upper end 14 of the lower member is slidably mounted. This construction permits the lower stem member to be moved axially of the cap upon rotation of the upper stem member, which remains in fixed axial position.

A major feature of the invention resides in the means provided for sealing the stem against leakage. To this end the upper stem member is provided with a sealing flange 16 which underlies shoulder 4 and cooperates with a gasket ring 17 disposed in the annular space between flange 16 and the upper end of cap 3. As will be observed from Fig. 1, the upper, sealing surface 18 of flange 16 is of spherical form, and it is from this arcuate, or convex, contour that the benefits of the invention largely arise.

Flange 16 is continuously impelled into sealing contact with gasket ring 17 by a coil spring 19 seated between the lower face of the flange and an appropriate support within the cap, most suitably the shoulder formed by the upper end of sleeve 11.

A further major feature of the invention to which its benefits are due resides in the type of gasket ring used. This ring consists of a hard, substantially unyielding, material which resists wear and flow in use. I have found that hard compositions formed of asbestos and a mineral binder are particularly suitable for this purpose. They are hard, resist wear, do not flow under pressure and withstand steam and temperatures up to 900° F. without deterioration.

In order to avoid leakage around gasket ring 17 a soft gasket 20 is interposed between it and shoulder 4, for instance, a thin layer of soft material which acts as a sealing cushion to prevent leakage between the ring and cap. I have found that sheet steam packing approximately $\frac{1}{32}$ inch in thickness is suitable for this purpose. It adhesively bonds the gasket ring in place and absolutely prevents leakage back of the ring, even under very high pressures.

Spring 19 continuously urges flange 16 into positive sealing engagement with gasket ring 17, and positively acts to prevent leakage around the stem. This action is augmented by internal fluid pressure within the cap due to escape of fluid past the shank 10. Hitherto this has been a prolific source of stem leakage, especially when the valves are closed. In the valves provided by this invention such fluid pressure acting upon the lower side of flange 16 causes it to increase its sealing action with the gasket ring.

The particular combination of flange surface and character of gasket ring described afford results which characterize the invention and distinguish it from prior constructions. The seal formed is leak-tight by virtue of upward impelling of an arcuate sealing surface against a ring which does not flow. This provides results not attainable by ordinary plane surfaced sealing flanges, and by virtue of this combination perfect sealing is had for both closed and open positions of the valve.

It is not essential that the upper flange surface be exactly spherical, satisfactory results being obtained by other arcuate contours, but preferably the curvature of the surface is steep. In the preferred embodiment the gasket ring initially presents a relatively small area of contact to the flange, for example a narrow face tapered at 45° to the body of the ring. The flange surface then readily seats throughout such area, and as the valve is used the flange continuously wipes the surface to keep it polished and maintain perfect contact surfaces.

The invention may be embodied in any suitable type of valve body. However, it is applied preferably to bodies having a removable, replaceable valve seat, and having a valve head of a particular, and novel, construction now to be described. In the customary stem constructions the valve head is swivelled at the end of the stem, and as the valve is closed the head stops turning immediately upon contacting with the seat. Thereafter the head moves axially of the seat. In such constructions foreign matter, such as grit, particles of metal, and the like, is therefore pressed between the valve seat and disc, and it may, and frequently does, prevent complete closing of the valve, permitting leakage through the valve. Moreover the seat may be permanently injured.

It has been common practice to provide removable metallic valve seats, but in such instances it has been necessary to grind the disc to the seat, and to connect the disc to the stem in such manner that it will swivel or rock, so that the two will seat properly upon closure of the valve. Such constructions are likewise open to the disadvantages just referred to.

In accordance with this invention these difficulties are overcome by providing a replaceable seat formed of a hard unyielding gasket material of the type referred to above, and by forming the valve head integral with the stem. One embodiment of this aspect of the invention is shown in Fig. 2, in which a valve body 1a is provided with a cap 3a and two-part stem structure of the type just described. In this embodiment lower stem member 8a is provided at its lower end with an integral valve head 21 machined to provide a curved, for example ball-shaped, surface. Body 1a is provided with a replaceable valve seat, the form shown comprising a metallic ring 22 connected by external screw threads 23 to the body of the valve. A narrow flange 24 extends inwardly from the lower edge of ring 22. Molded within the ring is a seat member 25 formed of hard unyielding asbestos composition, such as that just described. The upper surface of the seat is shaped to conform to the contour of head 21.

In this construction as the valve is closed head 21 continuously rotates during closing and opening movements of the stem, and thus it approaches and leaves seat 25 with a wiping action, instead of ceasing rotation upon contact with the seat. This moves, or breaks up, particles of foreign matter which, being continuously moved are carried away by steam or other fluid passing through the valve. Hence such foreign matter does not interfere with proper seating of the valve. Also, the rotary action upon opening or closing of the valve maintains seat 25 polished for perfect seating.

The invention thus provides valves in which the customary packing glands are eliminated, together with the need for frequent replacement of packing material, because the gasket rings are hard and will last indefinitely, thus eliminating maintenance troubles and expense. The stems are not subject to the frictional engagement and wear of stem parts which have characterized the valves heretofore in use, which reduces replacement costs. Tests of valves made in accordance with the invention have shown that the stems are positively maintained against leakage, even under very high pressures, and for the most varied fluids.

Furthermore, the replaceable seat and integral head construction described also contributes to minimize maintenance and replacement costs, and insures reliable closing and sealing of the valve itself.

According to the provisions of the patent statutes, I have explained the construction and mode of operation of my invention and have illustrated and described what I now consider to represent its best embodiment. However, I desire to have it understood that, within the scope of the appended claims, the invention may be practiced otherwise than as specifically illustrated and described.

I claim:

1. A valve comprising in combination a body having a valve seat, a tubular cap mounted over said seat and provided at its upper end with a shoulder projecting inwardly over the top and at its lower end with an outwardly projecting flange, a retaining nut engaging said flange connected to said body, a sleeve held in fixed position in the lower end of said cap, a valve stem extending through said cap and comprising upper and lower members slidably connected within the cap, said lower member including a valve head adapted to cooperate with said seat, and an upwardly projecting shank having screw threads cooperating with threads formed in said sleeve, said upper member being provided with a spherically surfaced sealing flange underlying said shoulder within said cap and forming an annular space between said flange and cap, a hard substantially unyielding gasket ring disposed in said annular space, and a spring acting upon said sealing flange within said cap to urge its spherical surface into sealing contact with said gasket, fluid pressure within the cap acting to increase the sealing pressure between said gasket and flange.

2. A valve comprising in combination a body having a valve seat, a tubular cap member mounted over said seat and provided at its upper end with a shoulder projecting inwardly over the top and at its lower end with an outwardly projecting flange, a retaining nut engaging said flange connected to said body, a sleeve member held in fixed position in the lower end of said cap, a stem extending through said cap comprising upper and lower members, said upper member having at its lower end a bore of non-circular section and being provided beneath said shoulder with a sealing flange spherically surfaced on its upper side and forming with said shoulder and cap an annular space, said lower member including a valve head positioned to cooperate with said seat, a shank having an intermediate threaded portion cooperating with threads cut internally of said sleeve and having its upper end disposed slidably in said bore, rotation of the upper member causing the lower member to move axially of the cap and upper member, a hard unyielding asbestos composition gasket ring disposed in said annular space, a soft gasket interposed behind said ring to effect sealing between the gasket ring and cap, and a spring seated between said sleeve and sealing flange continuously urging its spherical surface into sealing contact with said gasket ring, fluid pressure within the cap acting to increase sealing pressure between said gasket ring and flange.

3. A valve comprising in combination a body having a valve seat, a tubular cap member mounted over said seat and provided at its upper end with a shoulder projecting inwardly over the top and at its lower end with an outwardly projecting flange, a retaining nut engaging said flange connected to said body, a sleeve member disposed in fixed position in the lower end of said cap, a stem extending through said cap comprising upper and lower members, said upper member having at its lower end a bore of non-circular section and being provided beneath said shoulder with a sealing flange spherically surfaced on its upper side and forming with said shoulder and cap an annular space, said lower member including a valve head positioned to cooperate with said seat, an intermediate threaded portion cooperating with threads cut internally of said sleeve, and an upper shank portion disposed slidably in said bore, rotation of the upper member causing the lower member to move axially of the cap and upper member, a hard unyielding asbestos composition gasket ring disposed in said annular space, a soft gasket interposed behind said gasket ring to effect sealing between said gasket ring and cap, said gasket ring presenting an angularly disposed surface of restricted area to said sealing flange surface, a spring seated between said sleeve and said flange on the upper stem member continuously urging its spherical surface into sealing contact with said gasket ring, fluid pressure within the cap acting to increase sealing pressure between the gasket and flange.

4. A valve according to claim 2, said gasket ring comprising hard molded composition of asbestos and mineral binder.

5. A valve comprising in combination a body provided with a replaceable seat of hard unyielding composition, a tubular cap mounted over said seat and provided at its upper end with a shoulder projecting inwardly over the top and at its lower end with an outwardly projecting flange, a retaining nut engaging said flange connected to said body, a sleeve member held in fixed position in the lower end of said cap, a valve stem extending through said cap and comprising upper and lower members slidably connected within the cap, said lower member having at its lower end an integral valve head adapted to cooperate with said seat, and having an upwardly projecting shank provided with screw threads cooperating with threads formed in said sleeve, said upper member being provided beneath said shoulder with a sealing flange spherically surfaced on its upper side and forming with said shoulder and cap an annular space, a hard unyielding gasket ring disposed in said space, a spring acting between said sleeve and sealing flange to continuously press the spherical surface of said flange into positive sealing contact with said gasket ring, and fluid pressure within the cap acting to increase sealing pressure between the gasket and flange.

6. A valve according to claim 5, said seat and gasket ring being formed of hard molded composition of asbestos and mineral binder.

In testimony whereof, I sign my name.

JOHN MILLER.